United States Patent
Chen et al.

(10) Patent No.: US 11,985,080 B2
(45) Date of Patent: May 14, 2024

(54) APPARATUS, SYSTEM, AND METHOD OF COMMUNICATING AN EXTREMELY HIGH THROUGHPUT (EHT) PHYSICAL LAYER (PHY) PROTOCOL DATA UNIT (PPDU)

(71) Applicant: INTEL CORPORATION, Santa Clara, CA (US)

(72) Inventors: Xiaogang Chen, Portland, OR (US); Qinghua Li, San Ramon, CA (US); Feng Jiang, Santa Clara, CA (US); Thomas J. Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 260 days.

(21) Appl. No.: 17/313,919

(22) Filed: May 6, 2021

(65) Prior Publication Data

US 2021/0266121 A1    Aug. 26, 2021

Related U.S. Application Data

(60) Provisional application No. 63/021,832, filed on May 8, 2020.

(51) Int. Cl.
*H04L 5/00* (2006.01)
*H04W 72/0453* (2023.01)

(52) U.S. Cl.
CPC .......... *H04L 5/0007* (2013.01); *H04L 5/0048* (2013.01); *H04W 72/0453* (2013.01)

(58) Field of Classification Search
CPC ... H04L 5/0007; H04L 5/0048; H04L 5/0094; H04L 27/2602; H04L 5/003; H04W 72/0453; H04W 72/23; H04W 84/12
See application file for complete search history.

(56) References Cited

U.S. PATENT DOCUMENTS

| 11,128,505 B2 * | 9/2021 | Chen ............ H04L 5/0094 |
| 11,395,185 B2 * | 7/2022 | Chen ............ H04W 72/0453 |

(Continued)

FOREIGN PATENT DOCUMENTS

WO    WO-2020233214 A1 *  11/2020  ........... H04L 5/0044

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

(Continued)

*Primary Examiner* — Mounir Moutaouakil
(74) *Attorney, Agent, or Firm* — Shichrur & Co.

(57) ABSTRACT

For example, an Extremely High Throughput (EHT) wireless communication station (STA) may be configured to set a Resource Unit (RU) allocation subfield in an EHT Signal (SIG) field to indicate an RU assignment for an Orthogonal Frequency Division Multiple Access (OFDMA) EHT Physical layer (PHY) Protocol Data Unit (PPDU) according to a predefined RU allocation table, the RU assignment for the OFDMA EHT PPDU comprising a Multiple Resource Unit (MRU) comprising a plurality of RUs; and transmit the OFDMA EHT PPDU comprising the EHT SIG field.

32 Claims, 5 Drawing Sheets

(56) References Cited

U.S. PATENT DOCUMENTS

| | | | | |
|---|---|---|---|---|
| 11,626,963 | B2* | 4/2023 | Chen | H04B 7/046 370/329 |
| 11,638,202 | B2* | 4/2023 | Cavalcanti | H04W 88/08 370/252 |
| 11,641,657 | B2* | 5/2023 | Chen | H04L 5/0094 370/329 |
| 11,671,943 | B2* | 6/2023 | Lim | H04W 72/04 370/329 |
| 11,711,786 | B2* | 7/2023 | Hu | H04L 1/0071 370/329 |
| 11,825,493 | B2* | 11/2023 | Hu | H04W 72/0453 |
| 2019/0373586 | A1* | 12/2019 | Verma | H04W 72/51 |
| 2020/0015219 | A1* | 1/2020 | Asterjadhi | H04W 28/20 |
| 2020/0112408 | A1* | 4/2020 | Verma | H04B 7/0452 |
| 2020/0136884 | A1* | 4/2020 | Park | H04L 27/2602 |
| 2020/0177425 | A1* | 6/2020 | Chen | H04L 27/2602 |
| 2020/0305024 | A1* | 9/2020 | Chen | H04W 76/10 |
| 2020/0329444 | A1* | 10/2020 | Cao | H04W 72/044 |
| 2020/0396742 | A1* | 12/2020 | Park | H04W 76/11 |
| 2021/0045151 | A1* | 2/2021 | Chen | H04W 74/002 |
| 2021/0127291 | A1* | 4/2021 | Chen | H04W 28/0231 |
| 2021/0258116 | A1* | 8/2021 | Chen | H04L 27/2602 |
| 2021/0266098 | A1* | 8/2021 | Cao | H04L 1/0643 |
| 2021/0281363 | A1* | 9/2021 | Wu | H04L 1/0003 |
| 2021/0281384 | A1* | 9/2021 | Hu | H04L 5/0094 |
| 2021/0288752 | A1* | 9/2021 | Suh | H04L 1/0058 |
| 2021/0329628 | A1* | 10/2021 | Hu | H04W 72/51 |
| 2021/0351894 | A1* | 11/2021 | Lin | H04W 28/20 |
| 2021/0377971 | A1* | 12/2021 | Park | H04W 72/535 |
| 2022/0167307 | A1* | 5/2022 | Chen | H04W 72/30 |
| 2023/0179458 | A1* | 6/2023 | Park | H04L 27/2614 370/338 |

OTHER PUBLICATIONS

IEEE P802.11ax™/D6.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Nov. 2019, 780 pages.

* cited by examiner

APPARATUS, SYSTEM, AND METHOD OF COMMUNICATING AN EXTREMELY HIGH THROUGHPUT (EHT) PHYSICAL LAYER (PHY) PROTOCOL DATA UNIT (PPDU)

CROSS REFERENCE

This application claims the benefit of and priority from U.S. Provisional Patent Application No. 63/021,832 entitled "Extreme High Throughput Resource Unit Allocation Table", filed May 8, 2020, the entire disclosure of which is incorporated herein by reference.

TECHNICAL FIELD

Embodiments described herein generally relate to communicating an Extremely High Throughput (EHT) Physical layer (PHY) Protocol Data Unit (PPDU).

BACKGROUND

Some wireless communication networks may provide high-throughput data for users of wireless communication devices. For example, some wireless communication networks may utilize Orthogonal Frequency-Division Multiple Access (OFDMA) in channel allocation for wireless transmissions.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
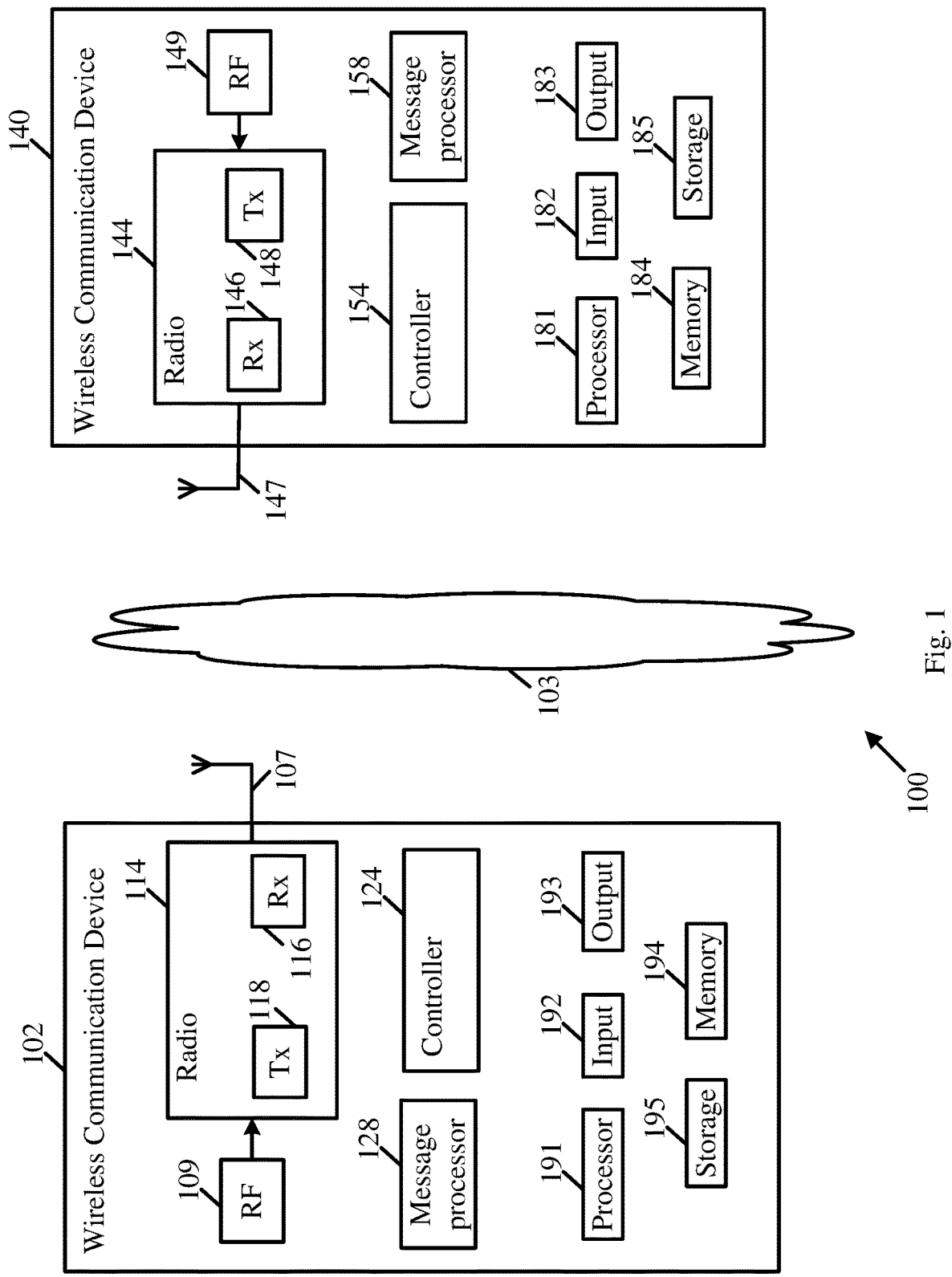
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements; Part 11: Wireless LAN Medium Access Control (MAC) and Physical Layer (PHY) Specifications, Dec. 7, 2016); and/or IEEE 802.11be (IEEE P802.11be/D0.4 Draft Standard for Information technology— Telecommunications and information exchange between systems Local and metropolitan area networks— Specific requirements; Part 11: Wireless LAN Medium Access Control (MAC) and Physical Layer (PHY) Specifications; Amendment 8: Enhancements for extremely high throughput (EHT), March 2021)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared, dedicated, or, group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band between 1 GHz and 7.250 Ghz, for example, a 2.4 Gigahertz (GHz) frequency band, a 5 GHz frequency band, and/or a 6 GHz frequency band. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative embodiments may be implemented by an Extremely High Throughput (EHT) STA, which may include for example, a STA having a radio transmitter, which is capable of operating on a channel that is in frequency bands between 1 GHz and 7.250 Ghz. The EHT STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a Smartphone, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a video source, an audio source, a video sink, an audio sink, a stereo tuner, a broadcast radio receiver, a digital audio player, a speaker, an audio receiver, an audio amplifier, a gaming device, a data source, a data sink, a media player, a television, a music player, a smart device such as, for example, lamps, climate control, car components, household components, appliances, and the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a display, a screen, a touch-screen, one or more audio speakers or earphones, and/or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data.

For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a frequency band in frequency bands between 1 GHz and 7.250 GHz, for example, a 2.4 GHz band, a 5 GHz band, a 6 GHz band, and/or any other frequency band, for example, frequency band above 45 GHz, an S1G band, and/or any other band.

In some demonstrative embodiments, radios 114 and/or 144 may include, or may be associated with one or more, e.g., a plurality of, antennas.

In some demonstrative embodiments, device 102 may include one or more, e.g., a single antenna or a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a single antenna, a plurality of antennas, a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more EHT STAs. For example, device 102 may include, operate as, perform the role of, and/or perform one or more functionalities of, at least one EHT STA, and/or device 140 may include, operate as, perform the role of, and/or perform one or more functionalities of, at least one EHT STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., an EHT AP.

In some demonstrative embodiments, device 102 and/or device 140 may be configured to operate as, perform the role of, and/or perform one or more functionalities of, a non-AP STA, e.g., an EHT non-AP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments devices 102 and/or 140 may be configured to communicate over an EHT network, and/or any other network. For example, devices 102 and/or 140 may perform Multiple-Input-Multiple-Output (MIMO) communication, for example, for communicating over the EHT networks, e.g., over an EHT frequency band, e.g., in frequency bands between 1 GHz and 7.250 GHz.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11be Specification, and/or any other specification and/or protocol.

In some demonstrative embodiments, devices 102 and/or 140 may be configured according to one or more standards, for example, in accordance with an IEEE 802.11be Standard, which may be configured, for example, to enhance the efficiency and/or performance of an IEEE 802.11 Specification, which may be configured to provide Wi-Fi connectivity.

Some demonstrative embodiments may enable, for example, to significantly increase the data throughput defined in the IEEE 802.11-2016 Specification, for example, up to a throughput of 30 Giga bits per second (Gbps), or to any other throughput, which may, for example, satisfy growing demand in network capacity for new coming applications.

Some demonstrative embodiments may be implemented, for example, to support increasing a transmission data rate, for example, by applying MIMO and/or Orthogonal Frequency Division Multiple Access (OFDMA) techniques.

In some demonstrative embodiments, devices 102 and/or 140 may be configured to communicate MIMO communications and/or OFDMA communication in frequency bands between 1 GHz and 7.250 GHz.

In some demonstrative embodiments, device 102 and/or device 140 may be configured to support one or more mechanisms and/or features, for example, OFDMA, Single User (SU) MIMO, and/or Multi-User (MU) MIMO, for example, in accordance with an IEEE 802.11be Standard and/or any other standard and/or protocol.

In some demonstrative embodiments, device 102 and/or device 140 may include, operate as, perform a role of, and/or perform the functionality of, one or more EHT STAs. For example, device 102 may include, operate as, perform a role of, and/or perform the functionality of, at least one EHT STA, and/or device 140 may include, operate as, perform a role of, and/or perform the functionality of, at least one EHT STA.

In some demonstrative embodiments, devices 102 and/or 140 may implement a communication scheme, which may include Physical layer (PHY) and/or Media Access Control (MAC) layer schemes, for example, to support one or more applications, and/or increased throughput, e.g., throughputs up to 30 Gbps, or any other throughput.

In some demonstrative embodiments, the PHY and/or MAC layer schemes may be configured to support OFDMA techniques, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an EHT network, and/or any other network and/or any other frequency band. For example, devices 102 and/or 140 may be configured to communicate DL MIMO transmissions and/or UL MIMO transmissions, for example, for communicating over the EHT networks.

In some demonstrative embodiments, devices 102 and/or 140 may be configured to communicate over a channel bandwidth, e.g., of at least 20 Megahertz (MHz), in frequency bands between 1 GHz and 7.250 GHz.

In some demonstrative embodiments, devices 102 and/or 140 may be configured to implement one or more mechanisms, which may, for example, support communication over a channel BW (also referred to as a "wide channel" or "wide BW") covering two or more channels, e.g., two or more 20 MHz channels, e.g., as described below.

In some demonstrative embodiments, wide channel mechanisms may include, for example, a mechanism and/or an operation whereby two or more channels, e.g., 20 MHz channels, can be combined, aggregated or bonded, e.g., for a higher bandwidth of packet transmission, for example, to enable achieving higher throughputs, e.g., when compared to transmissions over a single channel. Some demonstrative embodiments are described herein with respect to communication over a channel BW including two or more 20 MHz channels, however other embodiments may be implemented with respect to communications over a channel bandwidth, e.g., a "wide" channel, including or formed by any other number of two or more channels, for example, a bonded or aggregated channel including a bonding or an aggregation of two or more channels.

In some demonstrative embodiments, device 102 and/or device 140 may be configured to communicate one or more transmissions over one or more channel BWs, for example, including a channel BW of 20 MHz, a channel BW of 40 MHz, a channel BW of 80 MHz, a channel BW of 160 MHz, a channel BW of 320 MHz, and/or any other additional or alternative channel BW, e.g., as described below.

In some demonstrative embodiments, devices 102 and/or 140 may be configured to generate, process, transmit and/or receive a Physical Layer (PHY) Protocol Data Unit (PPDU) having a PPDU format (also referred to as "EHT PPDU format"), which may be configured, for example, for communication between EHT stations, e.g., as described below.

In some demonstrative embodiments, a PPDU, e.g., an EHT PPDU, may include at least one non-EHT field, e.g., a legacy field, which may be identified, decodable, and/or processed by one or more devices ("non-EHT devices", or "legacy devices"), which may not support one or more features and/or mechanisms ("non-legacy" mechanisms or "non-EHT mechanisms"). For example, the legacy devices may include non-EHT stations and/or non-High Throughput (HT) stations, which may be, for example, configured according to an IEEE 802.11-2016 Standard, and the like.

Figure 2:
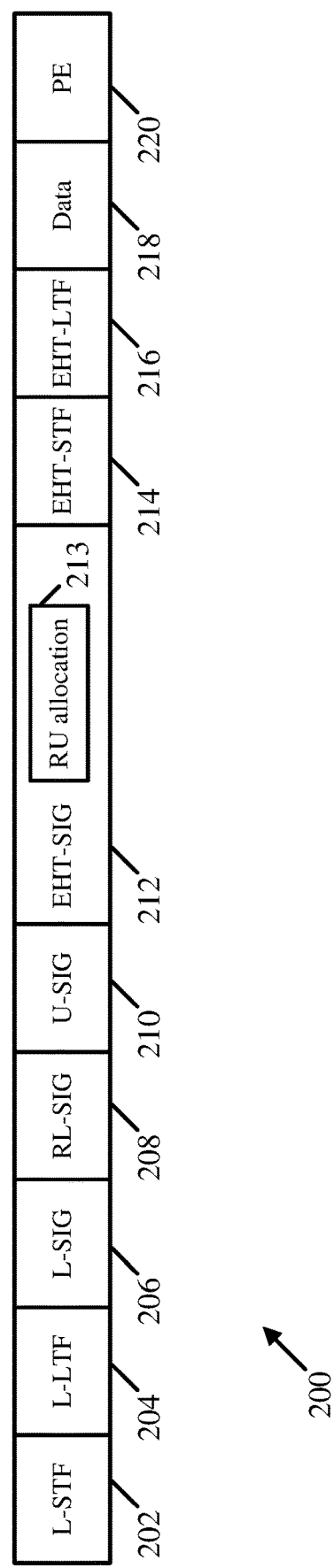
FIG. 2 is a schematic illustration of an Extremely High Throughput (EHT) Physical layer (PHY) Protocol Data Unit (PPDU) format, which may be implemented in accordance with some demonstrative embodiments.

Reference is made to FIG. 2, which schematically illustrates an EHT PPDU format 200, which may be implemented in accordance with some demonstrative embodiments. In one example, devices 102 (FIG. 1) and/or 140 (FIG. 1) may be configured to generate, transmit, receive and/or process one or more EHT PPDUs having the structure and/or format of EHT PPDU 200.

In one example, devices 102 (FIG. 1) and/or 140 (FIG. 1) may communicate EHT PPDU 200, for example, as part of a transmission over a channel, e.g., an EHT channel, having a channel bandwidth including one or more 20 MHz channels, for example, a channel BW of 20 MHz, a channel BW of 40 MHz, a channel BW of 80 MHz, a channel BW of 160 MHz, a channel BW of 320 MHz, and/or any other additional or alternative channel BW, e.g., as described below.

In some demonstrative embodiments, EHT PPDU 200 may include an EHT MU PPDU, which may be utilized for transmission from an EHT STA, e.g., an EHT STA implemented by device 102 (FIG. 1), to one or more users, for example, one or more EHT STAs, including an EHT STA implemented by device 140 (FIG. 1).

In some demonstrative embodiments, as shown in FIG. 2, EHT PPDU 200 may include a non-High Throughput (non-HT) (legacy) Short Training Field (STF) (L-STF) 202, followed by a non-HT (Legacy) Long Training Field (LTF) (L-LTF) 204, which may be followed by a non-HT Signal (SIG) (L-SIG) field 206.

In some demonstrative embodiments, as shown in FIG. 2, EHT PPDU 200 may include a repeated non-HT SIG (RL-SIG) field 208, which may follow the L-SIG field 206. The RL-SIG field 208 may be followed by a Universal SIG (U-SIG) field 210.

In some demonstrative embodiments, as shown in FIG. 2, EHT PPDU 200 may include a plurality of EHT-modulated fields, e.g., following the U-SIG field 210.

In some demonstrative embodiments, as shown in FIG. 2, the EHT modulated fields may include, for example, an EHT Signal (EHT-SIG) field 212.

In some demonstrative embodiments, as shown in FIG. 2, the EHT modulated fields may include, for example, an EHT STF (EHT-STF) field 214, e.g., following the EHT-SIG field 212.

In some demonstrative embodiments, as shown in FIG. 2, the EHT modulated fields may include, for example, an EHT LTF (EHT-LTF) field 216, e.g., following the EHT-STF field 214.

In some demonstrative embodiments, as shown in FIG. 2, the EHT modulated fields may include, for example, a data field 218, e.g., following the EHT-LTF field 216, and/or a Packet Extension (PE) field 220, e.g., following the data field 218.

In some demonstrative embodiments, EHT PPDU 200 may include some or all of the fields shown in FIG. 2 and/or one or more other additional or alternative fields.

Referring back to FIG. 1, in some demonstrative embodiments, devices 102 and/or 140 may be configured to generate, transmit, receive and/or process one or more transmissions, e.g., including one or more EHT PPDUs, e.g., as described below.

In some demonstrative embodiments, for example, devices 102 and/or 140 may be configured to perform one or more operations, and/or functionalities of an EHT STA, which may be configured, for example, to generate, transmit, receive and/or process one or more transmissions, e.g., including one or more EHT PPDUs, e.g., including one or more fields according to the EHT PPDU format of FIG. 2.

In some demonstrative embodiments, devices 102 and/or 140 may be configured to generate, transmit, receive and/or process an EHT PPDU, e.g., in accordance with an IEEE 802.11be Specification and/or any other specification, e.g., as described below.

In some demonstrative embodiments, for example, devices 102 and/or 140 may be configured to perform one or more operations, and/or functionalities of an EHT STA, which may be configured, for example, to generate, transmit, receive and/or process the EHT PPDU as an EHT MU PPDU, for example, in accordance with the EHT PPDU formal 200 (FIG. 2).

In some demonstrative aspects, the EHT MU PPDU may include a PPDU that carries one or more PHY service data units (PSDUs) for one or more STAs using a downlink multi-user multiple input, multiple output (DL-MU-MIMO) technique, an orthogonal frequency division multiple access (DL OFDMA) technique, or a combination of the two techniques.

In some demonstrative embodiments, for example, devices 102 and/or 140 may be configured to perform one or more operations, and/or functionalities of an EHT STA, which may be configured, for example, to generate, transmit, receive and/or process the EHT MU PPDU, for example, over a 20 MHz channel width, a 40 MHz channel width, a 80 MHz channel width, a 160 MHz channel width, and/or a 320 Mhz channel width.

In other embodiments, any other additional or alternative channel width may be utilized.

In some demonstrative embodiments, for example, devices 102 and/or 140 may be configured to perform one or more operations, and/or functionalities of an EHT STA, which may be configured, for example, to generate, transmit, receive and/or process the EHT PPDU as an Orthogonal Frequency Division Multiple Access (OFDMA) EHT PPDU, for example, in accordance with the EHT PPDU formal 200 (FIG. 2).

In some demonstrative embodiments, the OFDMA EHT PPDU may include an EHT PPDU which includes more than one resource unit (RU) or multiple resource unit (MRU). In one example, each RU and/or MRU in the OFDMA EHT PPDU may allocated to a different STA.

In some demonstrative embodiments, for example, controller 124 may be configured to cause, trigger, and/or control the EHT implemented by device 102 to generate, process and transmit an OFDMA EHT PPDU including one or more RUs and/or MRUs allocated to one or more EHT STAs, for example, including a n EHT STA implemented by device 140, e.g., as described below.

In some demonstrative embodiments, for example, devices 102 and/or 140 may be configured to generate, transmit, receive and/or process the EHT PPDU including an EHT-SIG field, e.g., EHT-SIG field 212 (FIG. 2), which may be designed according to a signaling field structure, which may provide one or more technical benefits and/or advantages, e.g., as described below.

In some demonstrative aspects, the EHT PPDU including an EHT-SIG field, e.g., EHT-SIG field 212 (FIG. 2), may be designed according to a signaling field structure, which may provide a harmonized solution, for example, based on, and/or in compliance with, a High Efficiency (HE) SIG B (HE-SIG-B) structure.

In some demonstrative aspects, the EHT-SIG field, e.g., EHT-SIG field 212 (FIG. 2), may be designed according to a signaling field structure, which may provide a technical solution to a deadlock between a proposed design according to a self-contained signaling, which may support simplicity, and a proposed design based on a reuse of an HE-SIG-B design, which may support simplicity in reusing an implementation according to the IEEE 802.11ax Standard.

In some demonstrative embodiments, the EHT-SIG field, e.g., EHT-SIG field 212 (FIG. 2), may be configured to include a Resource Unit (RU) allocation subfield, e.g., a RU allocation subfield 213 (FIG. 2), as described below.

In some demonstrative aspects, the RU allocation subfield 213 (FIG. 2) may be configured to provide a technical solution to support extension of a RU allocation Table, e.g., in compliance with the IEEE 802.11ax Standard.

In some demonstrative embodiments, the RU allocation subfield, e.g., RU allocation subfield 213 (FIG. 2), in an EHT-SIG field, e.g., EHT-SIG field 212 (FIG. 2), may be configured to indicate an RU assignment for an OFDMA EHT PPDU, e.g., as described below.

In some demonstrative embodiments, e RU allocation subfield, e.g., RU allocation subfield 213 (FIG. 2), in an EHT-SIG field, e.g., EHT-SIG field 212 (FIG. 2), may be configured to indicate the RU assignment for the OFDMA EHT PPDU according to a predefined RU allocation table, e.g., as described below.

In some demonstrative embodiments, the RU allocation table may be configured and/or designed, for example, based on an extension of an RU allocation table according to the IEEE 802.11ax Standard, e.g., as described below.

In some demonstrative embodiments, the RU assignment for the OFDMA EHT PPDU may include an assignment of RUs and/or MRUs to one or more users of the OFDMA EHT PPDU, e.g., as described below.

In some demonstrative embodiments, an EHT STA, e.g., an EHT STA implemented by device 102, may be configured to set the RU allocation subfield in an EHT-SIG field, e.g., RU allocation subfield 213 (FIG. 2) in EHT-SIG field 212 (FIG. 2), to indicate an RU assignment, e.g., as described below.

In some demonstrative embodiments, the EHT STA, e.g., the EHT STA implemented by device 102, may be configured to transmit the RU allocation subfield in the EHT-SIG field of an OFDMA EHT PPDU, e.g., as described below.

In some demonstrative embodiments, the EHT STA, e.g., the EHT STA implemented by device 102, may be configured to generate, configure and/or transmit one or more fields of the OFDMA EHT PPDU based on the RU assignment indicated by the RU allocation subfield in the EHT-SIG field of the OFDMA EHT PPDU, e.g., as described below.

In some demonstrative embodiments, the EHT STA, e.g., the EHT STA implemented by device 102, may be configured to generate, configure and/or transmit one or more EHT modulated fields of the OFDMA EHT PPDU based on the RU assignment indicated by the RU allocation subfield in the EHT-SIG field of the OFDMA EHT PPDU, e.g., as described below.

In some demonstrative embodiments, the EHT STA, e.g., the EHT STA implemented by device 102, may be configured to generate, configure and/or transmit one or more EHT modulated fields of the OFDMA EHT PPDU to one or more users, for example, based on the RU assignment indicated by the RU allocation subfield in the EHT-SIG field of the OFDMA EHT PPDU, e.g., as described below.

In some demonstrative embodiments, the one or more EHT modulated fields of the OFDMA EHT PPDU may include, for example, an EHT-STF, e.g., EHT-STF field 214 (FIG. 2), an EHT-LTF, e.g., EHT-LTF field 216 (FIG. 2), a data field, e.g., data field 218 (FIG. 2), and/or a PE field, e.g., PE field 220 (FIG. 2).

In other embodiments, the one or more EHT modulated fields of the OFDMA EHT PPDU may include any other additional or alternative fields.

In some demonstrative embodiments, for example, controller 124 may be configured to cause, trigger, and/or control an EHT implemented by device 102 to set an RU allocation subfield to indicate an RU assignment for one or more users of an OFDMA EHT PPDU, e.g., as described below.

In some demonstrative embodiments, for example, controller 124 may be configured to cause, trigger, and/or control the EHT implemented by device 102 to transmit the RU allocation subfield as part of an EHT-SIG field, e.g., RU allocation subfield 213 (FIG. 2) in EHT-SIG field 212 (FIG. 2), of the OFDMA EHT PPDU, e.g., as described below.

In some demonstrative embodiments, for example, controller 124 may be configured to cause, trigger, and/or control the EHT implemented by device 102 to transmit one or more other fields, e.g., one or more EHT modulated fields, of the OFDMA EHT PPDU to the one or more users, for example, according to the RU assignment indicated by the RU allocation subfield in the EHT-SIG field, e.g., as described below.

In some demonstrative embodiments, the RU allocation subfield may be configured to indicate an RU assignment for the OFDMA EHT PPDU to include an MRU, e.g., as described below.

In some demonstrative embodiments, the MRU may include a plurality of RUs, e.g., as described below.

In some demonstrative embodiments, the MRU may include a combination of a plurality of RUs, e.g., as described below.

In some demonstrative embodiments, the MRU may include a plurality of non-contiguous RUs, e.g., as described below.

In some demonstrative embodiments, the RU allocation subfield may be configured to indicate the RU assignment for the OFDMA EHT PPDU to include a small MRU, e.g., as described below.

In some demonstrative embodiments, the small MRU may include a 78-tone MRU, which may include a combination of a 52-tone RU and a 26-tone RU, e.g., as described below.

In some demonstrative embodiments, the small MRU may include a 132-tone MRU, which may include a combination of a 106-tone RU and a 26-tone RU, e.g., as described below.

In other embodiments, any other small MRU may be defined based on any other combination of any other RUs, e.g., "small" RUs.

In some demonstrative embodiments, the RU allocation subfield may be configured to indicate the RU assignment for the OFDMA EHT PPDU to include one or more other RUs, which may include, for example, a 26-tone RU, a 52-tone RU, and/or a 106-tone RU, e.g., as described below.

In some demonstrative embodiments, the RU allocation subfield may be configured to indicate the RU assignment for the OFDMA EHT PPDU to include one small MRU, e.g., as described below.

In some demonstrative embodiments, the RU allocation subfield may be configured to indicate the RU assignment for the OFDMA EHT PPDU to include a plurality of small MRUs, e.g., as described below.

In some demonstrative embodiments, the RU allocation subfield may be configured to indicate the RU assignment for the OFDMA EHT PPDU to include a first small MRU and a second small MRU, e.g., as described below.

In some demonstrative embodiments, the RU allocation subfield may be configured to indicate the RU assignment for the OFDMA EHT PPDU to include first and second small MRUs of a same size, e.g., as described below.

In some demonstrative embodiments, the RU allocation subfield may be configured to indicate the RU assignment for the OFDMA EHT PPDU to include first and second 78-tone small MRUs, e.g., as described below.

In some demonstrative embodiments, the RU allocation subfield may be configured to indicate the RU assignment for the OFDMA EHT PPDU to include first and second small MRUs of different sizes, e.g., as described below.

In some demonstrative embodiments, the RU allocation subfield may be configured to indicate the RU assignment for the OFDMA EHT PPDU to include a 78-tone small MRU and a 132-tone small MRU, e.g., as described below.

In some demonstrative embodiments, the RU allocation subfield may be configured to indicate the RU assignment for the OFDMA EHT PPDU to include a large MRU, e.g., as described below.

In some demonstrative embodiments, the large MRU may include a combination of one or more "large" RUs, for example, including at least one RU with a count of tones, which is equal to or greater than 242 tones, e.g., as described below.

In some demonstrative embodiments, the large MRU may include a combination of one or more "large" RUs, for example, including at least one RU with a count of tones, which is equal to or greater than 484 tones, e.g., as described below.

In some demonstrative embodiments, the large MRU may include a 996+484-tone MRU including a 996-tone RU and a 484-tone RU. In one example, the large MRU may be formed as a combination of a 996-tone RU and a 484-tone RU, e.g., as described below.

In some demonstrative embodiments, the large MRU may include a 484+242-tone MRU including a 484-tone RU and a 242-tone RU. In one example, the large MRU may be formed as a combination of a 484-tone RU and a 242-tone RU, e.g., as described below.

In some demonstrative embodiments, the large MRU may include a 2*996-tone MRU including two 996-tone RUs. In one example, the large MRU may be formed as a combination of two 996-tone RUs, e.g., as described below.

In some demonstrative embodiments, the large MRU may include a 3*996-tone MRU including three 996-tone RUs. In one example, the large MRU may be formed as a combination of three 996-tone RUs, e.g., as described below.

In some demonstrative embodiments, the large MRU may include a 996+484+242-tone MRU including a 996-tone RU, a 484-tone RU, and a 242-tone RU. In one example, the large MRU may be formed as a combination of a 996-tone RU, a 484-tone RU, and a 242-tone RU, e.g., as described below.

In other embodiments, any other large MRU may be defined based on any other combination of any other RUs, e.g., "large" RUs.

In some demonstrative embodiments, an RU allocation subfield in an EHT-SIG field, e.g., the RU allocation subfield 213 (FIG. 2) in EHT-SIG field 212 (FIG. 2), may be configured to indicate the RU assignment for the OFDMA EHT PPDU according to a predefined RU allocation table, e.g., as described below.

In some demonstrative embodiments, the RU allocation table may be configured and/or designed, for example, based on an extension of an RU allocation table in compliance with the IEEE 802.11ax Standard, e.g., as described below.

In some demonstrative embodiments, the RU allocation table may be configured and/or designed, for example, to include and/or cover one or more RUs, which may be defined, for example, for a large BW, and/or one or more non-contiguous RUs, for example, which may be defined in compliance with an IEEE 802.11be Standard, e.g., as described below.

In some demonstrative embodiments, the RU allocation table may include, e.g., in a first part of the RU allocation table, a plurality of "reused" entries, which may be based on, and/or in compliance with, one or more entries of the IEEE 802.11ax Standard, e.g., with some possible modifications, e.g., as described below.

In some demonstrative embodiments, one or more of the reused entries, e.g., some or all of the reused entries, may be restricted for use without MU-MIMO, e.g., as described below.

In some demonstrative embodiments, MU-MIMO communication of a PPDU may be restricted to RUs having a tone count, which is larger than a predefined tone count (size), e.g., as described below.

In some demonstrative embodiments, MU-MIMO communication may be restricted to RUs having a tone size of at least 242 tones, e.g., as described below.

In other embodiments, the MU-MIMO communication may be restricted to RUs above any other minimum RU tone size.

In some demonstrative embodiments, the RU allocation table may include, e.g., in a second part of the RU allocation table, one or more RU assignments including one or more MRUs, for example, one or more Multi-RUs (MRUs) for large RUs, e.g., in compliance, with an IEEE 802.11be Specification, e.g., as described below.

In some demonstrative embodiments, the RU allocation table may include one or more RU assignments including one or more large MRUs, e.g., as described below.

In some demonstrative embodiments, the RU allocation table may include one or more RU assignments including one or more non-contiguous multi-RUs, which may be defined for OFDMA transmission, e.g., as described below.

In some demonstrative embodiments, the RU allocation table may include, e.g., in a third part of the RU allocation table, one or more RU assignments including one or more MRUs, for example, one or more Multi-RUs (MRUs) for small RUs, e.g., in compliance, with an IEEE 802.11be Specification, e.g., as described below.

In some demonstrative embodiments, the RU allocation table may include one or more RU assignments including one or more small MRUs, e.g., as described below.

In some demonstrative embodiments, the one or more small RUs may be implemented, for example, as an extension of a small RU concept, for example, in compliance with the IEEE 802.11ax Standard, e.g., as described below.

In some demonstrative aspects, controller 124 may be configured to cause, trigger, and/or control an EHT STA implemented by device 102, to set an RU allocation subfield in an EHT-SIG field to indicate an RU assignment for an OFDMA EHT PPDU according to a predefined RU allocation table, e.g., as described below.

In some demonstrative embodiments, the RU assignment for the OFDMA EHT PPDU may include an MRU including a plurality of RUs, e.g., as described below.

In some demonstrative aspects, controller 124 may be configured to cause, trigger, and/or control the EHT STA to transmit the OFDMA EHT PPDU including the EHT SIG field, e.g., as described below.

In some demonstrative aspects, controller 124 may be configured to cause, trigger, and/or control the EHT STA to transmit the OFDMA EHT PPDU over a channel bandwidth of 20 MHz, 40 MHz, 80 MHz, or 160 MHz.

In some demonstrative aspects, controller 124 may be configured to cause, trigger, and/or control the EHT STA to transmit the OFDMA EHT PPDU over a 320 MHz channel bandwidth.

In other embodiments, the OFDMA EHT PPDU may be transmitted over any other channel bandwidth.

In some demonstrative embodiments, the MRU may include a large MRU, e.g., as described below.

In some demonstrative embodiments, the large MRU may include an RU of at least 242 tones, e.g., as described below.

In some demonstrative embodiments, the large MRU may include an RU of at least 484 tones, e.g., as described below.

In some demonstrative embodiments, the large MRU may include a 996+484-tone MRU including a 996-tone RU and a 484-tone RU, e.g., as described below.

In some demonstrative embodiments, the large MRU may include a 484+242-tone MRU including a 484-tone RU and a 242-tone RU, e.g., as described below.

In some demonstrative embodiments, the large MRU may include a 2*996-tone MRU including two 996-tone RUs, e.g., as described below.

In some demonstrative embodiments, the large MRU may include a 3*996-tone MRU including three 996-tone RUs, e.g., as described below.

In some demonstrative embodiments, the large MRU may include a 996+484+242-tone MRU including a 484-tone RU, a 996-tone RU, and a 242-tone RU, e.g., as described below.

In other embodiments, the large MRU may include any other combination of RUs, e.g., including at least one large RU, for example, at least one RU including at least 242 tones.

In some demonstrative embodiments, the MRU may include a small MRU, e.g., as described below.

In some demonstrative embodiments, the small MRU may include at least one of a 78-tone MRU and/or a 132-tone MRU, e.g., as described below.

In some demonstrative embodiments, the 78-tone MRU may include a combination of a 52-tone RU and a 26-tone RU.

In some demonstrative embodiments, the 132-tone RU may include a combination of a 106-tone RU and a 26-tone RU.

In some demonstrative embodiments, the RU assignment for the OFDMA EHT PPDU may include the 78-tone MRU and one or more 26-tone RUs, e.g., as described below.

In some demonstrative embodiments, the RU assignment for the OFDMA EHT PPDU may include the 78-tone MRU and one or more 52-tone RUs, e.g., as described below.

In some demonstrative embodiments, the RU assignment for the OFDMA EHT PPDU may include the 78-tone MRU, one or more 26-tone RUs, and one or more 52-tone RUs, e.g., as described below.

In some demonstrative embodiments, the RU assignment for the OFDMA EHT PPDU may include the 78-tone MRU and a 106-tone RU, e.g., as described below.

In some demonstrative embodiments, the RU assignment for the OFDMA EHT PPDU may include the 78-tone MRU, a 106-tone RU, and one or more 26-tone RUs, e.g., as described below.

In some demonstrative embodiments, the RU assignment for the OFDMA EHT PPDU may include a first 78-tone MRU, and a second 78-tone RU, e.g., as described below.

In some demonstrative embodiments, the RU assignment for the OFDMA EHT PPDU may include the 132-tone MRU and one or more 26-tone RUs, e.g., as described below.

In some demonstrative embodiments, the RU assignment for the OFDMA EHT PPDU may include the 132-tone MRU and one or more 52-tone RUs, e.g., as described below.

In some demonstrative embodiments, the RU assignment for the OFDMA EHT PPDU may include the 132-tone MRU, a 26-tone RU, and a 52-tone RU, e.g., as described below.

In some demonstrative embodiments, the RU assignment for the OFDMA EHT PPDU may include the 132-tone MRU and a 106-tone RU, e.g., as described below.

In some demonstrative embodiments, the RU assignment for the OFDMA EHT PPDU may include the 78-tone MRU and the 132-tone RU, e.g., as described below.

In other embodiments, the small MRU may include any other combination of RUs, e.g., including small RUs, and/or the RU assignment for the OFDMA EHT PPDU may include any other combination of one or more small MRUs and/or one or more RUs.

In some demonstrative embodiments, the MRU may include a plurality of non-contiguous RUs.

In other embodiments, one or more contiguous RUs may be utilized.

In some demonstrative embodiments, the RU assignment may include a plurality of entries, for example, 8 entries, to indicate a number of users to be allocated to the RU assignment in a Multi-User Multiple-Input-Multiple-Output (MU-MIMO) transmission of the OFDMA EHT PPDU, e.g., as described below.

In some demonstrative embodiments, the predefined RU allocation table may be configured to restrict MU-MIMO transmission to RU assignments including RUs of at least a predefined number of tones, e.g., as described below.

In some demonstrative embodiments, the predefined RU allocation table may be configured to restrict to a single user transmission one or more RU assignments, e.g., all RU assignments, in which all RUs are shorter than a predefined tone size, e.g., as described below.

In some demonstrative embodiments, the predefined RU allocation table may be configured to restrict to a single user transmission one or more RU assignments, e.g., all RU assignments, where each RU includes less than 242 tones, e.g., as described below.

In some demonstrative embodiments, the predefined RU allocation table may include a plurality of RU assignments (106-tone RU assignments) including at least one 106-tone RU. For example, the plurality of 106-tone RU assignments may include a number-of-entries set to "1" to restrict the plurality of 106-tone RU assignments to a single user transmission, e.g., as described below.

In some demonstrative aspects, controller 154 may be configured to cause, trigger, and/or control an EHT STA implemented by device 140 to receive and process the OFDMA EHT PPDU from device 102.

In some demonstrative embodiments, controller 154 may be configured to cause, trigger, and/or control the EHT STA implemented by device 140 to process information in the RU allocation subfield of the EHT-SIG field, e.g., RU allocation subfield 213 (FIG. 2) of the EHT-SIG 212 (FIG. 2), in the received OFDMA EHT PPDU.

In some demonstrative embodiments, controller 154 may be configured to cause, trigger, and/or control the EHT STA implemented by device 140 to determine an RU allocation for the EHT STA implemented by device 140, for example, based on the information in the RU allocation subfield in the received OFDMA EHT PPDU.

In some demonstrative embodiments, controller 154 may be configured to cause, trigger, and/or control the EHT STA implemented by device 140 to process one or more fields of the received OFDMA EHT PPDU, based on the RU allocation for the EHT STA.

For example, controller 154 may be configured to cause, trigger, and/or control the EHT STA implemented by device 140 to process the EHT-STF field 214 (FIG. 2), the EHT-LTF field 216 (FIG. 2), the data field 218 (FIG. 2), and/or the PE field 220 (FIG. 2), based on the RU allocation for the EHT STA implemented by device 140, as determined from the information in the RU allocation subfield in the received OFDMA EHT PPDU.

In some demonstrative aspects, controller 124 may be configured to cause, trigger, and/or control the EHT STA implemented by device 102 to encode the RU-allocation subfield, e.g., RU-allocation subfield 213 (FIG. 2), together with one or more overflow bits of a Universal Signal (U-SIG) field of the OFDMA EHT PPDU, e.g., one or more overflow bits of U-SIG field 210 (FIG. 1), e.g., as described below.

In some demonstrative aspects, controller 124 may be configured to cause, trigger, and/or control the EHT STA implemented by device 102 to set the RU allocation subfield, e.g., RU allocation subfield 213 (FIG. 2), for example, according to an RU allocation table, which may be defined to include one or more, e.g., some or all, entries of the following table:

TABLE 1

| #1 | #2 | #3 | #4 | #5 | #6 | #7 | #8 | #9 | Number of entries |
|----|----|----|----|----|----|----|----|----|-------------------|
| Reuse 11ax 26 | 26 | 26 | 26 | 26 | 26 | 26 | 26 | 26 | 1 |
| 26 | 26 | 26 | 26 | 26 | 26 | 26 | 52 | | 1 |
| 26 | 26 | 26 | 26 | 26 | 52 | | 26 | 26 | 1 |
| 26 | 26 | 26 | 26 | 26 | 52 | | 52 | | 1 |
| 26 | 26 | 52 | | 26 | 26 | 26 | 26 | 26 | 1 |
| 26 | 26 | 52 | | 26 | 26 | 26 | 52 | | 1 |
| 26 | 26 | 52 | | 26 | 52 | | 26 | 26 | 1 |
| 26 | 26 | 52 | | 26 | 52 | | 52 | | 1 |
| 52 | | 26 | 26 | 26 | 26 | 26 | 26 | 26 | 1 |
| 52 | | 26 | 26 | 26 | 26 | 26 | 52 | | 1 |
| 52 | | 26 | 26 | 26 | 52 | | 26 | 26 | 1 |
| 52 | | 26 | 26 | 26 | 52 | | 52 | | 1 |
| 52 | | 52 | | 26 | 26 | 26 | 26 | 26 | 1 |
| 52 | | 52 | | 26 | 26 | 26 | 52 | | 1 |
| 52 | | 52 | | 26 | 52 | | 26 | 26 | 1 |
| 52 | | 52 | | 26 | 52 | | 52 | | 1 |
| 52 | | 52 | | — | 106 | | | | 1 |
| | 106 | | | — | 52 | | 52 | | 1 |
| 26 | 26 | 26 | 26 | 1 | 106 | | | | 1 |
| 26 | 26 | | 52 | 26 | | 1 | | | 1 |
| | 52 | 26 | 26 | 26 | | 1 | | | 1 |
| | 52 | | 52 | 26 | 106 | | | | 1 |
| | | 106 | | 26 | 26 | 26 | 1 | 26 | 1 |
| | | 106 | | 26 | 26 | 26 | | 1 | 1 |
| | | 106 | | 26 | 52 | | 26 | 1 | 1 |
| | | 106 | | 26 | 52 | | 52 | | 1 |
| | | 106 | | | — | 106 | | | 1 |
| 52 | | 52 | | — | 52 | | 52 | | 1 |
| 242-tone RU empty (with zero users) | | | | | | | | | 1 |
| 484-tone RU; contributes zero User fields to the User Specific field in the same HE-SIG-B content channel as this RU Allocation subfield | | | | | | | | | 1 |
| 996-tone RU; contributes zero User fields to the User Specific field in the same HE-SIG-B content channel as this RU Allocation subfield | | | | | | | | | 1 |
| Reserved | | | | | | | | | 4 |
| Reserved | | | | | | | | | 8 |
| 242 | | | | | | | | | 8 |
| 484 | | | | | | | | | 8 |
| 996 | | | | | | | | | 8 |
| Reserved | | | | | | | | | 8 |
| Reserved | | | | | | | | | 32 |

TABLE 1-continued

| | #1 | #2 | #3 | #4 | #5 | #6 | #7 | #8 | #9 | Number of entries |
|---|---|---|---|---|---|---|---|---|---|---|
| 11be MRU (Large RU) | | | | 484 + 996 | | | | | | 9 |
| | | | | 484 + 242 | | | | | | 9 |
| | | | | 996 * 2 | | | | | | 9 |
| | | | | 996 * 3 | | | | | | 9 |
| | | | | 996 + 484 + 242 | | | | | | 9 |
| | | | Entries for new MRU defined later | | | | | | | 9 |
| | | | | | | | | | | 9 |
| | | | | | | | | | | 9 |
| 11be MRU (Small RU) | 26 | | 78 | | 26 | 26 | 26 | 26 | 26 | 1 |
| | 26 | | 78 | | 26 | 26 | 26 | | 52 | 1 |
| | 26 | | 78 | | 26 | 52 | | 26 | 26 | 1 |
| | 26 | | 78 | | 26 | 52 | | 52 | | 1 |
| | 26 | 26 | 26 | 26 | 26 | | 78 | | 26 | 1 |
| | | 52 | | 26 | 26 | 26 | 78 | | 26 | 1 |
| | 26 | 26 | | 52 | 26 | | 78 | | 26 | 1 |
| | | 52 | | 52 | 26 | | 78 | | 26 | 1 |
| | 26 | | 78 | | | 26 | 78 | | 26 | 1 |
| | | | | reserved | | | | | | 1 |
| | 26 | | 78 | | 26 | | 106 | | | 1 |
| | | | 106 | | 26 | | 78 | | 26 | 1 |
| | | | 132 | | | 26 | 26 | 26 | 26 | 1 |
| | | | 132 | | | 26 | 26 | | 52 | 1 |
| | | | 132 | | | | 52 | 26 | 26 | 1 |
| | | | 132 | | | | 52 | | 52 | 1 |
| | 26 | 26 | 26 | 26 | | | 132 | | | 1 |
| | | 52 | | 26 | 26 | | 132 | | | 1 |
| | 26 | 26 | | 52 | | | 132 | | | 1 |
| | | 52 | | 52 | | | 132 | | | 1 |
| | 26 | | 78 | | | | 132 | | | 1 |
| | | | 132 | | | | 78 | | 26 | 1 |
| | | | 132 | | | | | 106 | | 1 |
| | | | 106 | | | | 132 | | | 1 |

In some demonstrative embodiments, an RU allocation table, e.g., including one or more entries of the Table 1, may include a part ("Reuse 11 ax"), which may be configured to reuse one or more entries in compliance with the IEEE 802.11ax Standard, for example, with some modifications.

In some demonstrative embodiments, for example, as shown in Table 1, a minimum RU size for MU-MIMO transmission may be restricted to RUs with a predefined tone size, for example, to RUs with a tone size equal to or greater than 242 tones.

In some demonstrative embodiments, as shown in Table 1, a number of entries used for a MU-MIMO indication for 106-tone RUs may be configured to only need one entry, for example, when defining that MU-MIMO is not to be conducted in 106-tone RUs.

In some demonstrative embodiments, an RU allocation table, e.g., including one or more entries of the Table 1, may include a part ("1 lbe MRU (Large RU)"), which may be configured to support RU assignments including a Multi-RU for large RU, e.g., in accordance with an IEEE 802.11be Standard.

In some demonstrative embodiments, as shown in Table 1, the RU allocation table may include RU assignments including non-contiguous multi-RUs, which may be defined, for example, for OFDMA transmission.

In some demonstrative embodiments, as shown in Table 1, an MRU, e.g., every Multi-RU, may utilize 9 entries, for example, to support a maximum of 8 users to be scheduled for MU-MIMO transmission.

In some demonstrative embodiments, the 9 entries in Table 1 may include one entry, which may be used to indicate contribute zero User fields to the User Specific field in the same EHT-SIG content channel as this RU Allocation subfield. the 9 entries in Table 1 may include 8 other entries, which may be configured for use to indicate the number of users allocated to the RU.

In some demonstrative embodiments, an RU allocation table, e.g., including one or more entries of the Table 1, may include a part ("11be MRU (Small RU)"), which may be configured to support RU assignments including a Multi-RU for small RU, e.g., in accordance with an IEEE 802.11be Standard.

In some demonstrative embodiments, as shown in Table 1, the RU allocation table may include RU assignments including small MRUs formed by RUs of a small RU size, e.g., RUs with less than 242 tones.

In some demonstrative embodiments, as shown in Table 1, the RU assignments with the small MRUs may be configured as an extension compatible with the IEEE 802.11ax Standard.

In some demonstrative embodiments, as shown in Table 1, the RU assignments with the small MRUs may include RU assignments including a 78-tone RU, e.g., including a combination of a 52-tone RU and a 26-tone RU (52+26=78).

In some demonstrative embodiments, as shown in Table 1, the RU assignments with the small MRUs may include RU assignments including a 132-tone RU, e.g., including a combination of a 106-tone RU and a 26-tone RU (106+26=132).

In some demonstrative embodiments, a large MRU may be configured according to one or more puncturing patterns, e.g., as described below.

In some demonstrative embodiments, a puncturing pattern of a large MRU may include a "spacing" between two non-contiguous RUs, e.g., as described below.

In some demonstrative embodiments, a 996+484-tone MRU may be configured according to a first puncturing pattern, e.g., according to the following Table 2, or according to a second puncturing pattern, e.g., according to the following Table 3:

TABLE 2

| 996 + 484 combination 1 | | | RU allocation subfield CC1 | RU allocation subfield CC2 |
|---|---|---|---|---|
| 320 MHz | 996 | 1 | 996 + 484 (1STA) | |
| | | 2 | | 996 + 484 (0STA) |
| | | 1 | 996 + 484 (0STA) | |
| | | 2 | | 996 + 484 (0STA) |
| | Punctured | 1 | 242 (0STA) | |
| | | 2 | | 242 (0STA) |
| | 484 | 1 | 996 + 484 (0STA) | |
| | | 2 | | 996 + 484 (0STA) |
| | 996*2 | | 996*2 (1STA) | |
| | | | | 996*2 (0STA) |
| | | | 996*2 (0STA) | |
| | | | | 996*2 (0STA) |
| | | | 996*2 (0STA) | |
| | | | | 996*2 (0STA) |
| | | | 996*2 (0STA) | |
| | | | | 996*2 (0STA) |

TABLE 3

| 996 + 484 combination 2 | | | RU allocation subfield CC1 | RU allocation subfield CC2 |
|---|---|---|---|---|
| 320 MHz | 484 | 1 | 996 + 484 (1STA) | |
| | | 2 | | 996 + 484 (0STA) |
| | Punctured | 1 | 242 (0STA) | |
| | | 2 | | 242 (0STA) |
| | 996 | 1 | 996 + 484 (0STA) | |
| | | 2 | | 996 + 484 (0STA) |
| | | 1 | 996 + 484 (0STA) | |
| | | 2 | | 996 + 484 (0STA) |
| | 996*2 | | 996*2 (1STA) | |
| | | | | 996*2 (0STA) |
| | | | 996*2 (0STA) | |
| | | | | 996*2 (0STA) |
| | | | 996*2 (0STA) | |
| | | | | 996*2 (0STA) |
| | | | 996*2 (0STA) | |
| | | | | 996*2 (0STA) |

In other embodiments, any other additional or alternative puncturing pattern may be implemented.

In some demonstrative embodiments, as shown in Table 2, the first 996+484 combination of RUs may have a 40 MHz punctured in a 2nd 80 MHz bandwidth.

In some demonstrative embodiments, as shown in Table 3, the second 996+484 combination of RUs may have a 40 MHz punctured in a 1st 80 MHz bandwidth.

In some demonstrative embodiments, as shown by Tables 2 and 3, 9 entries may be used for one MRU in the RU allocation Table 1. For example, there may be no need to assign 9 entries for every MRU combination for the same MRU size.

Figure 3:
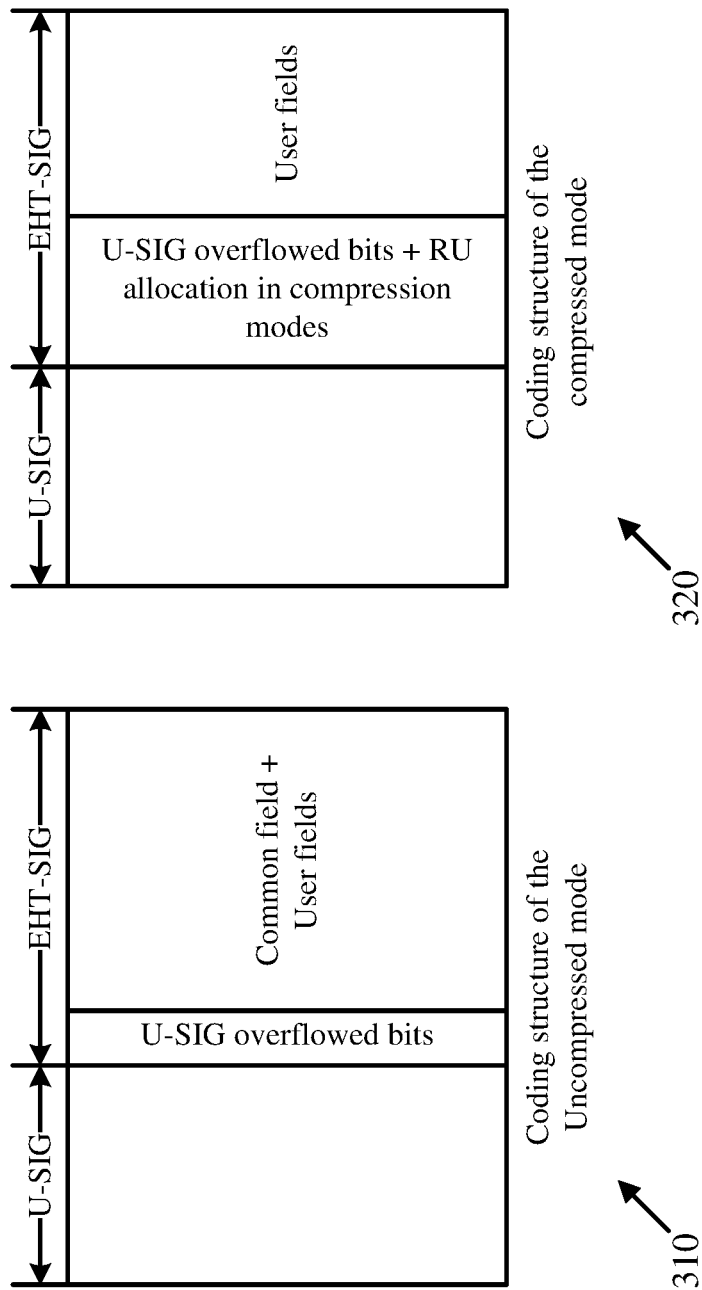
FIG. 3 is a schematic illustration of a first encoding scheme and a second encoding scheme, which may be implemented in accordance with some demonstrative embodiments.

Reference is made to FIG. 3, which schematically illustrates a first encoding scheme 310 and a second encoding scheme 320, which may be implemented in accordance with some demonstrative embodiments.

In some demonstrative embodiments, controller 124 may be configured to cause, trigger, and/or control an EHT STA to encode one or more fields of an EHT PPDU according to encoding scheme 310 and/or encoding scheme 320, e.g., as described below.

In some demonstrative embodiments, encoding scheme 310 may be configured, for example, for encoding a U-SIG field, e.g., U-SIG field 210 (FIG. 2), and an EHT-SIG, e.g., EHT-SIG field 212 (FIG. 2), of a EHT PPDU at an uncompressed mode, for example, for an OFDMA transmission.

In some demonstrative embodiments, as shown in FIG. 3, a common field and user fields of the EHT-SIG field may be encoded while reusing a structure in compliance with the IEEE 802.11ax Standard, for example, according to the encoding scheme 310 for the uncompressed mode.

In some demonstrative embodiments, as shown in FIG. 3, according to the encoding scheme 310, one or more overflowed bits from the U-SIG field may be together with the EHT-SIG field.

In some demonstrative embodiments, as shown in FIG. 3, according to the encoding scheme 310, the one or more overflowed bits from the U-SIG field may be encoded separately, e.g., separate from the common field and user fields in the EHT-SIG field.

In some demonstrative embodiments, encoding scheme 320 may be configured, for example, for encoding a U-SIG field, e.g., U-SIG field 210 (FIG. 2), and an EHT-SIG, e.g., EHT-SIG field 212 (FIG. 2), of a EHT PPDU at a compressed mode, for example, for a non-OFDMA transmission.

In some demonstrative embodiments, as shown in FIG. 3, a common field for RU allocation may not be present in the EHT-SIG field, for example, in the compressed mode.

In some demonstrative embodiments, as shown in FIG. 3, RU allocation information may be utilized, for example, for compressed indication in the compressed mode.

In some demonstrative embodiments, the amount of RU allocation information in the compressed mode may be less than the amount of RU allocation information in the uncompressed mode.

In some demonstrative embodiments, as shown in FIG. 3, according to the encoding scheme 320, the compressed RU allocation information and one or more U-SIG overflowed bits may be encoded together, e.g., in a same codeword.

Figure 4:
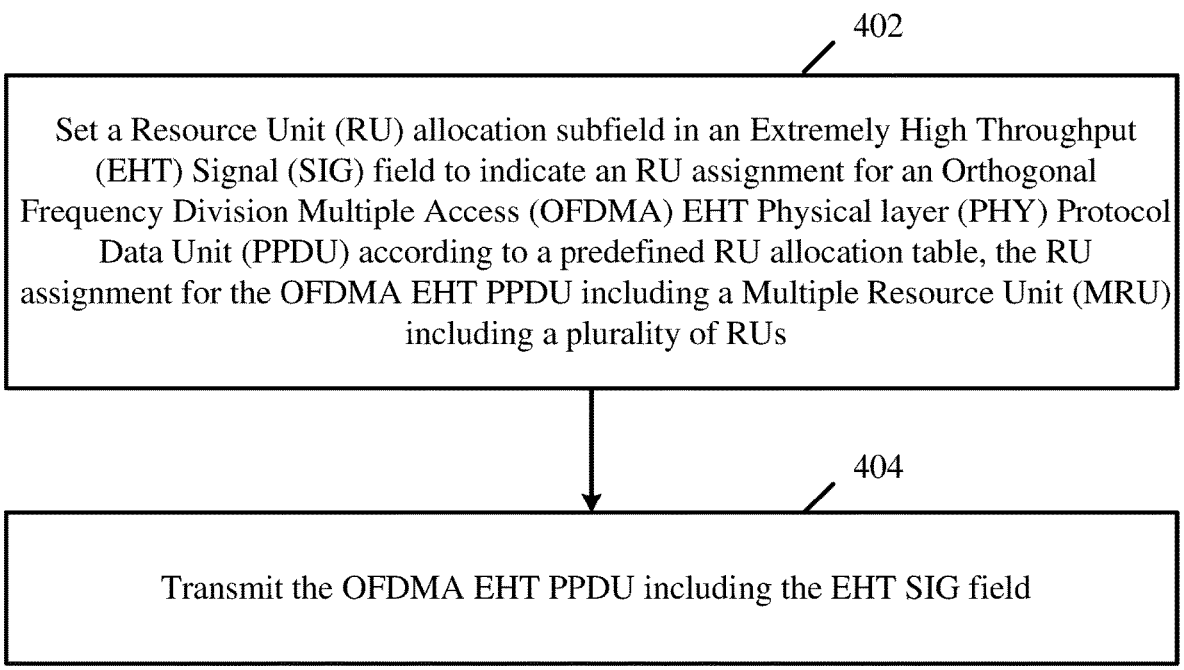
FIG. 4 is a schematic flow-chart illustration of a method of transmitting an Extremely High Throughput (EHT) PPDU, in accordance with some demonstrative embodiments.

Reference is made to FIG. 4, which schematically illustrates a method of transmitting an EHT PPDU, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include setting an RU allocation subfield in an EHT-SIG field to indicate an RU assignment for an OFDMA EHT PPDU according to a predefined RU allocation table, the RU assignment for the OFDMA EHT PPDU including an MRU including a plurality of RUs. For example, controller 124 (FIG. 1) may be configured to cause, trigger, and/or control device 102 (FIG. 1) to set the RU allocation subfield 213 (FIG. 2) in EHT-SIG field 212 (FIG. 2) of EHT PPDU 200 (FIG. 2), e.g., as described above.

As indicated at block 404, the method may include transmitting the OFDMA EHT PPDU including the EHT SIG field. For example, controller 124 (FIG. 1) may be configured to cause, trigger, and/or control device 102 (FIG. 1) to transmit the OFDMA EHT PPDU including the RU allocation subfield 213 (FIG. 2) in the EHT-SIG field 212 (FIG. 2), e.g., as described above.

Figure 5:
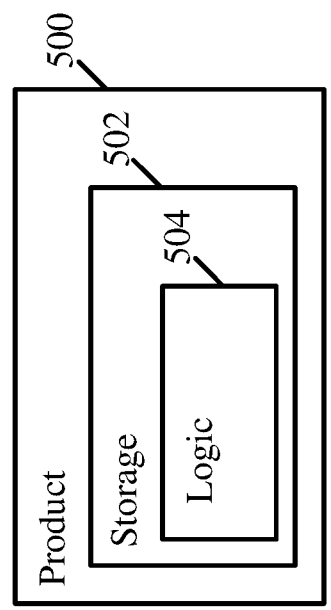
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable ("machine-readable") non-transitory storage media 502, which may include computer-executable instructions, e.g., implemented by logic 504, operable to, when executed by at least one computer processor, enable the at least one computer processor to implement one or more operations at device 102 (FIG. 1), device 140 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1); to cause device 102 (FIG. 1), device 140 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1) to perform, trigger and/or implement one or more operations and/or functionalities; and/or to perform, trigger and/or implement one or more operations and/or functionalities described with reference to the FIGS. 1, 2, 3, and/or 4, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 500 and/or machine readable storage media 502 may include one or more types of computer-readable storage media capable of storing data, including volatile memory, non-volatile memory, removable or non-removable memory, erasable or non-erasable memory, writeable or re-writeable memory, and the like. For example, machine readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Extremely High Throughput (EHT) wireless communication station (STA) to set a Resource Unit (RU) allocation subfield in an EHT Signal (SIG) field to indicate an RU assignment for an Orthogonal Frequency Division Multiple Access (OFDMA) EHT Physical layer (PHY) Protocol Data Unit (PPDU) according to a predefined RU allocation table, the RU assignment for the OFDMA EHT PPDU comprising a Multiple Resource Unit (MRU) comprising a plurality of RUs; and transmit the OFDMA EHT PPDU comprising the EHT SIG field.

Example 2 includes the subject matter of Example 1, and optionally, wherein the MRU comprises a large MRU, the large MRU comprising an RU of at least 242 tones.

Example 3 includes the subject matter of Example 2, and optionally, wherein the large MRU comprises a 996+484-tone MRU comprising a 996-tone RU and a 484-tone RU.

Example 4 includes the subject matter of Example 2, and optionally, wherein the large MRU comprises a 484+242-tone MRU comprising a 484-tone RU and a 242-tone RU.

Example 5 includes the subject matter of Example 2, and optionally, wherein the large MRU comprises a 2*996-tone MRU comprising two 996-tone RUs.

Example 6 includes the subject matter of Example 2, and optionally, wherein the large MRU comprises a 3*996-tone MRU comprising three 996-tone RUs.

Example 7 includes the subject matter of Example 2, and optionally, wherein the large MRU comprises a 996+484+242-tone MRU comprising a 484-tone RU, a 996-tone RU, and a 242-tone RU.

Example 8 includes the subject matter of Example 1, and optionally, wherein the MRU comprises a small MRU, the small MRU comprising at least one of a 78-tone MRU or a 132-tone MRU, the 78-tone MRU comprising a combination of a 52-tone RU and a 26-tone RU, the 132-tone RU comprising a combination of a 106-tone RU and a 26-tone RU.

Example 9 includes the subject matter of Example 8, and optionally, wherein the RU assignment for the OFDMA EHT PPDU comprises the 78-tone MRU and one or more 26-tone RUs.

Example 10 includes the subject matter of Example 8, and optionally, wherein the RU assignment for the OFDMA EHT PPDU comprises the 78-tone MRU and one or more 52-tone RUs.

Example 11 includes the subject matter of Example 8, and optionally, wherein the RU assignment for the OFDMA EHT PPDU comprises the 78-tone MRU, one or more 26-tone RUs, and one or more 52-tone RUs.

Example 12 includes the subject matter of Example 8, and optionally, wherein the RU assignment for the OFDMA EHT PPDU comprises the 78-tone MRU and a 106-tone RU.

Example 13 includes the subject matter of Example 8, and optionally, wherein the RU assignment for the OFDMA EHT PPDU comprises the 78-tone MRU, a 106-tone RU, and one or more 26-tone RUs.

Example 14 includes the subject matter of Example 8, and optionally, wherein the RU assignment for the OFDMA EHT PPDU comprises a first 78-tone MRU, and a second 78-tone RU.

Example 15 includes the subject matter of Example 8, and optionally, wherein the RU assignment for the OFDMA EHT PPDU comprises the 132-tone MRU and one or more 26-tone RUs.

Example 16 includes the subject matter of Example 8, and optionally, wherein the RU assignment for the OFDMA EHT PPDU comprises the 132-tone MRU and one or more 52-tone RUs.

Example 17 includes the subject matter of Example 8, and optionally, wherein the RU assignment for the OFDMA EHT PPDU comprises the 132-tone MRU, a 26-tone RU, and a 52-tone RU.

Example 18 includes the subject matter of Example 8, and optionally, wherein the RU assignment for the OFDMA EHT PPDU comprises the 132-tone MRU and a 106-tone RU.

Example 19 includes the subject matter of Example 8, and optionally, wherein the RU assignment for the OFDMA EHT PPDU comprises the 78-tone MRU and the 132-tone RU.

Example 20 includes the subject matter of any one of Examples 1-19, and optionally, wherein the MRU comprises a plurality of non-contiguous RUs.

Example 21 includes the subject matter of any one of Examples 1-20, and optionally, wherein the RU assignment comprises 8 entries to indicate a number of users to be allocated to the RU assignment in a Multi-User Multiple-Input-Multiple-Output (MU-MIMO) transmission of the OFDMA EHT PPDU.

Example 22 includes the subject matter of any one of Examples 1-21, and optionally, wherein the predefined RU allocation table comprises a plurality of RU assignments comprising at least one 106-tone RU, the plurality of RU assignments comprising a number-of-entries set to "1" to restrict the plurality of RU assignments to a single user transmission.

Example 23 includes the subject matter of any one of Examples 1-22, and optionally, wherein the apparatus is configured to cause the EHT STA to set a first RU allocation subfield and a second RU allocation subfield in the EHT SIG field, the first RU allocation subfield to indicate a first RU assignment for the OFDMA EHT PPDU, the second RU allocation subfield to indicate a second RU assignment for the OFDMA EHT PPDU.

Example 24 includes the subject matter of any one of Examples 1-23, and optionally, wherein the apparatus is configured to cause the EHT STA to encode the RU-allocation subfield together with one or more overflow bits of a Universal Signal (U-SIG) field of the OFDMA EHT PPDU.

Example 25 includes the subject matter of any one of Examples 1-24, and optionally, wherein the apparatus is configured to cause the EHT STA to transmit the OFDMA EHT PPDU over a channel bandwidth of 20 Megahertz (MHz), 40 MHz, or 160 MHz.

Example 26 includes the subject matter of any one of Examples 1-25, and optionally, wherein the apparatus is configured to cause the EHT STA to transmit the OFDMA EHT PPDU over a 320 Megahertz (MHz) channel bandwidth.

Example 27 includes the subject matter of any one of Examples 1-26, and optionally, comprising a radio to transmit the OFDMA EHT PPDU.

Example 28 includes the subject matter of Example 27, and optionally, comprising one or more antennas connected to the radio, and a processor to execute instructions of an operating system of the EHT STA.

Example 29 includes an apparatus comprising logic and circuitry configured to cause an Extremely High Throughput (EHT) wireless communication station (STA) to process a Resource Unit (RU) allocation subfield in a received EHT Signal (SIG) field to determine an RU assignment for the Orthogonal Frequency Division Multiple Access (OFDMA) EHT Physical layer (PHY) Protocol Data Unit (PPDU) according to a predefined RU allocation table, the RU assignment for the OFDMA EHT PPDU comprising a Multiple Resource Unit (MRU) comprising a plurality of RUs; and process one or more other fields of the OFDMA EHT PPDU according to the RU assignment for the OFDMA EHT PPDU.

Example 30 includes the subject matter of Example 29, and optionally, wherein the MRU comprises a large MRU, the large MRU comprising an RU of at least 242 tones.

Example 31 includes the subject matter of Example 30, and optionally, wherein the large MRU comprises a 996+484-tone MRU comprising a 996-tone RU and a 484-tone RU.

Example 32 includes the subject matter of Example 30, and optionally, wherein the large MRU comprises a 484+242-tone MRU comprising a 484-tone RU and a 242-tone RU.

Example 33 includes the subject matter of Example 30, and optionally, wherein the large MRU comprises a 2*996-tone MRU comprising two 996-tone RUs.

Example 34 includes the subject matter of Example 30, and optionally, wherein the large MRU comprises a 3*996-tone MRU comprising three 996-tone RUs.

Example 35 includes the subject matter of Example 30, and optionally, wherein the large MRU comprises a 996+484+242-tone MRU comprising a 484-tone RU, a 996-tone RU, and a 242-tone RU.

Example 36 includes the subject matter of Example 29, and optionally, wherein the MRU comprises a small MRU, the small MRU comprising at least one of a 78-tone MRU or a 132-tone MRU, the 78-tone MRU comprising a combination of a 52-tone RU and a 26-tone RU, the 132-tone RU comprising a combination of a 106-tone RU and a 26-tone RU.

Example 37 includes the subject matter of Example 36, and optionally, wherein the RU assignment for the OFDMA EHT PPDU comprises the 78-tone MRU and one or more 26-tone RUs.

Example 38 includes the subject matter of Example 36, and optionally, wherein the RU assignment for the OFDMA EHT PPDU comprises the 78-tone MRU and one or more 52-tone RUs.

Example 39 includes the subject matter of Example 36, and optionally, wherein the RU assignment for the OFDMA EHT PPDU comprises the 78-tone MRU, one or more 26-tone RUs, and one or more 52-tone RUs.

Example 40 includes the subject matter of Example 36, and optionally, wherein the RU assignment for the OFDMA EHT PPDU comprises the 78-tone MRU and a 106-tone RU.

Example 41 includes the subject matter of Example 36, and optionally, wherein the RU assignment for the OFDMA EHT PPDU comprises the 78-tone MRU, a 106-tone RU, and one or more 26-tone RUs.

Example 42 includes the subject matter of Example 36, and optionally, wherein the RU assignment for the OFDMA EHT PPDU comprises a first 78-tone MRU, and a second 78-tone RU.

Example 43 includes the subject matter of Example 36, and optionally, wherein the RU assignment for the OFDMA EHT PPDU comprises the 132-tone MRU and one or more 26-tone RUs.

Example 44 includes the subject matter of Example 36, and optionally, wherein the RU assignment for the OFDMA EHT PPDU comprises the 132-tone MRU and one or more 52-tone RUs.

Example 45 includes the subject matter of Example 36, and optionally, wherein the RU assignment for the OFDMA EHT PPDU comprises the 132-tone MRU, a 26-tone RU, and a 52-tone RU.

Example 46 includes the subject matter of Example 36, and optionally, wherein the RU assignment for the OFDMA EHT PPDU comprises the 132-tone MRU and a 106-tone RU.

Example 47 includes the subject matter of Example 36, and optionally, wherein the RU assignment for the OFDMA EHT PPDU comprises the 78-tone MRU and the 132-tone RU.

Example 48 includes the subject matter of any one of Examples 29-47, and optionally, wherein the MRU comprises a plurality of non-contiguous RUs.

Example 49 includes the subject matter of any one of Examples 29-48, and optionally, wherein the RU assignment comprises 8 entries to indicate a number of users to be allocated to the RU assignment in a Multi-User Multiple-Input-Multiple-Output (MU-MIMO) transmission of the OFDMA EHT PPDU.

Example 50 includes the subject matter of any one of Examples 29-49, and optionally, wherein the predefined RU allocation table comprises a plurality of RU assignments comprising at least one 106-tone RU, the plurality of RU assignments comprising a number-of-entries set to "1" to restrict the plurality of RU assignments to a single user transmission.

Example 51 includes the subject matter of any one of Examples 29-50, and optionally, wherein the apparatus is configured to cause the EHT STA to process a first RU allocation subfield and a second RU allocation subfield in the EHT SIG field, the first RU allocation subfield to indicate a first RU assignment for the OFDMA EHT PPDU, the second RU allocation subfield to indicate a second RU assignment for the OFDMA EHT PPDU.

Example 52 includes the subject matter of any one of Examples 29-51, and optionally, wherein the apparatus is configured to cause the EHT STA to decode the RU-allocation subfield together with one or more overflow bits of a Universal Signal (U-SIG) field of the OFDMA EHT PPDU.

Example 53 includes the subject matter of any one of Examples 29-52, and optionally, wherein the apparatus is configured to cause the EHT STA to receive the OFDMA EHT PPDU over a channel bandwidth of 20 Megahertz (MHz), 40 MHz, 80 MHz, or 160 MHz.

Example 54 includes the subject matter of any one of Examples 29-53, and optionally, wherein the apparatus is configured to cause the EHT STA to receive the OFDMA EHT PPDU over a 320 Megahertz (MHz) channel bandwidth.

Example 55 includes the subject matter of any one of Examples 29-54, and optionally, comprising a radio to receive the OFDMA EHT PPDU.

Example 56 includes the subject matter of Example 55, and optionally, comprising one or more antennas connected to the radio, and a processor to execute instructions of an operating system of the EHT STA.

Example 57 comprises an apparatus comprising means for executing any of the described operations of Examples 1-56.

Example 58 comprises a product comprising one or more tangible computer-readable non-transitory storage media comprising computer-executable instructions operable to, when executed by at least one processor, enable the at least one processor to cause a computing device to perform any of the described operations of Examples 1-56.

Example 59 comprises an apparatus comprising: a memory interface; and processing circuitry configured to: perform any of the described operations of Examples 1-56.

Example 60 comprises a method comprising any of the described operations of Examples 1-56.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a processor comprising logic and circuitry configured to cause an Extremely High Throughput (EHT) wireless communication station (STA) to:
   set a Resource Unit (RU) allocation subfield in an EHT Signal (SIG) field to indicate an RU assignment for an Orthogonal Frequency Division Multiple Access (OFDMA) EHT Physical layer (PHY) Protocol Data Unit (PPDU) according to a predefined RU allocation table, the RU assignment for the OFDMA EHT PPDU comprising a Multiple Resource Unit (MRU) comprising a plurality of RUs, wherein the predefined RU allocation table comprises a plurality of RU assignments, which comprise at least one 106-tone RU, the plurality of RU assignments comprising a number-of-entries set to "1" to restrict the plurality of RU assignments to a single user transmission; and
   transmit the OFDMA EHT PPDU comprising the EHT SIG field; and
   a memory to store information processed by the processor.

2. The apparatus of claim 1, wherein the MRU comprises a large MRU, the large MRU comprising an RU of at least 242 tones.

3. The apparatus of claim 2, wherein the large MRU comprises a 996+484-tone MRU comprising a 996-tone RU and a 484-tone RU.

4. The apparatus of claim 2, wherein the large MRU comprises a 484+242-tone MRU comprising a 484-tone RU and a 242-tone RU.

5. The apparatus of claim 2, wherein the large MRU comprises a 2*996-tone MRU comprising two 996-tone RUs.

6. The apparatus of claim 2, wherein the large MRU comprises a 3*996-tone MRU comprising three 996-tone RUs.

7. The apparatus of claim 1, wherein the RU assignment for the OFDMA EHT PPDU comprises at least one small MRU, the at least one small MRU comprising at least one of a 78-tone MRU or a 132-tone MRU, the 78-tone MRU comprising a combination of a 52-tone RU and a 26-tone RU, the 132-tone RU comprising a combination of a 106-tone RU and a 26-tone RU.

8. The apparatus of claim 7, wherein the RU assignment for the OFDMA EHT PPDU comprises the 78-tone MRU and one or more 26-tone RUs.

9. The apparatus of claim 7, wherein the RU assignment for the OFDMA EHT PPDU comprises the 78-tone MRU and one or more 52-tone RUs.

10. The apparatus of claim 7, wherein the RU assignment for the OFDMA EHT PPDU comprises the 78-tone MRU, one or more 26-tone RUs, and one or more 52-tone RUs.

11. The apparatus of claim 7, wherein the RU assignment for the OFDMA EHT PPDU comprises the 78-tone MRU and a 106-tone RU.

12. The apparatus of claim 7, wherein the RU assignment for the OFDMA EHT PPDU comprises the 78-tone MRU, a 106-tone RU, and one or more 26-tone RUs.

13. The apparatus of claim 7, wherein the RU assignment for the OFDMA EHT PPDU comprises a first 78-tone MRU, and a second 78-tone RU.

14. The apparatus of claim 7, wherein the RU assignment for the OFDMA EHT PPDU comprises the 132-tone MRU and one or more 26-tone RUs.

15. The apparatus of claim 7, wherein the RU assignment for the OFDMA EHT PPDU comprises the 132-tone MRU and one or more 52-tone RUs.

16. The apparatus of claim 7, wherein the RU assignment for the OFDMA EHT PPDU comprises the 132-tone MRU, a 26-tone RU, and a 52-tone RU.

17. The apparatus of claim 7, wherein the RU assignment for the OFDMA EHT PPDU comprises the 132-tone MRU and a 106-tone RU.

18. The apparatus of claim 7, wherein the RU assignment for the OFDMA EHT PPDU comprises the 78-tone MRU and the 132-tone RU.

19. The apparatus of claim 1, wherein the MRU comprises a plurality of non-contiguous RUs.

20. The apparatus of claim 1, wherein the RU assignment for the OFDMA EHT PPDU comprises 8 entries to indicate a number of users to be allocated to the RU assignment in a Multi-User Multiple-Input-Multiple-Output (MU-MIMO) transmission of the OFDMA EHT PPDU.

21. The apparatus of claim 1 configured to cause the EHT STA to set a first RU allocation subfield and a second RU allocation subfield in the EHT SIG field, the first RU allocation subfield to indicate a first RU assignment for the OFDMA EHT PPDU, the second RU allocation subfield to indicate a second RU assignment for the OFDMA EHT PPDU.

22. The apparatus of claim 1 configured to cause the EHT STA to encode the RU allocation subfield together with one or more overflow bits of a Universal Signal (U-SIG) field of the OFDMA EHT PPDU.

23. The apparatus of claim 1 configured to cause the EHT STA to transmit the OFDMA EHT PPDU over a channel bandwidth of 20 Megahertz (MHz), 40 MHz, or 160 MHz.

24. The apparatus of claim 1 configured to cause the EHT STA to transmit the OFDMA EHT PPDU over a 320 Megahertz (MHz) channel bandwidth.

25. The apparatus of claim 1 comprising a radio to transmit the OFDMA EHT PPDU.

26. The apparatus of claim 25 comprising one or more antennas connected to the radio, and another processor to execute instructions of an operating system of the EHT STA.

27. A product comprising one or more tangible computer-readable non-transitory storage media comprising computer-executable instructions operable to, when executed by at least one processor, enable the at least one processor to cause an Extremely High Throughput (EHT) wireless communication station (STA) to:
set a Resource Unit (RU) allocation subfield in an EHT Signal (SIG) field to indicate an RU assignment for an Orthogonal Frequency Division Multiple Access (OFDMA) EHT Physical layer (PHY) Protocol Data Unit (PPDU) according to a predefined RU allocation table, the RU assignment for the OFDMA EHT PPDU comprising a Multiple Resource Unit (MRU) comprising a plurality of RUs, wherein the predefined RU allocation table comprises a plurality of RU assignments, which comprise at least one 106-tone RU, the plurality of RU assignments comprising a number-of-entries set to "1" to restrict the plurality of RU assignments to a single user transmission; and
transmit the OFDMA EHT PPDU comprising the EHT SIG field.

28. The product of claim 27, wherein the MRU comprises a large MRU, the large MRU comprising an RU of at least 242 tones.

29. The product of claim 27, wherein the RU assignment for the OFDMA EHT PPDU comprises at least one small MRU, the at least one small MRU comprising at least one of a 78-tone MRU or a 132-tone MRU, the 78-tone MRU comprising a combination of a 52-tone RU and a 26-tone RU, the 132-tone RU comprising a combination of a 106-tone RU and a 26-tone RU.

30. The product of claim 27, wherein the instructions, when executed, cause the EHT STA to encode the RU allocation subfield together with one or more overflow bits of a Universal Signal (U-SIG) field of the OFDMA EHT PPDU.

31. An apparatus for an Extremely High Throughput (EHT) wireless communication station (STA), the apparatus comprising:
means for setting a Resource Unit (RU) allocation subfield in an EHT Signal (SIG) field to indicate an RU assignment for an Orthogonal Frequency Division Multiple Access (OFDMA) EHT Physical layer (PHY) Protocol Data Unit (PPDU) according to a predefined RU allocation table, the RU assignment for the OFDMA EHT PPDU comprising a Multiple Resource Unit (MRU) comprising a plurality of RUs, wherein the predefined RU allocation table comprises a plurality of RU assignments, which comprise at least one 106-tone RU, the plurality of RU assignments comprising a number-of-entries set to "1" to restrict the plurality of RU assignments to a single user transmission; and
means for causing the EHT STA to transmit the OFDMA EHT PPDU comprising the EHT SIG field.

32. The apparatus of claim 31, wherein the RU assignment for the OFDMA EHT PPDU comprises at least one small MRU, the at least one small MRU comprising at least one of a 78-tone MRU or a 132-tone MRU, the 78-tone MRU comprising a combination of a 52-tone RU and a 26-tone RU, the 132-tone RU comprising a combination of a 106-tone RU and a 26-tone RU.

* * * * *